(12) United States Patent
Murayama

(10) Patent No.: US 9,353,825 B2
(45) Date of Patent: May 31, 2016

(54) VIBRATION ABSORBING APPARATUS

(71) Applicants: DENSO CORPORATION, Kariya, Aichi-pref. (JP); Advics Co., Ltd., Kariya, Aichi-pref. (JP)

(72) Inventor: Takashi Murayama, Kariya (JP)

(73) Assignees: DENSO CORPORATION, Kariya, Aichi-pref. (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 14/333,817

(22) Filed: Jul. 17, 2014

(65) Prior Publication Data
US 2015/0021840 A1    Jan. 22, 2015

(30) Foreign Application Priority Data

Jul. 18, 2013 (JP) .................................. 2013-149372

(51) Int. Cl.
| | |
|---|---|
| *F16F 7/00* | (2006.01) |
| *F16F 15/08* | (2006.01) |
| *F16F 3/12* | (2006.01) |
| *B60G 11/22* | (2006.01) |
| *F16F 9/32* | (2006.01) |

(52) U.S. Cl.
CPC .................. *F16F 15/085* (2013.01); *F16F 3/12* (2013.01); *F16F 9/3207* (2013.01)

(58) Field of Classification Search
CPC ............. F16F 1/025; F16F 1/027; F16F 3/00; F16F 3/093; F16F 7/00; F16F 9/3207; F16F 9/54; F16F 9/56; F16F 15/08; F16F 15/085; F16F 3/12
USPC .......... 267/136, 293, 140.11, 140.12, 140.13, 267/140.3, 141.1, 141.2; 248/560, 562, 248/636, 638
See application file for complete search history.

(56) References Cited

U.S. PATENT DOCUMENTS

| | | | | |
|---|---|---|---|---|
| 544,034 | A | * 8/1895 | Gavin | ..................... G09F 13/00 40/551 |
| 4,066,058 | A | * 1/1978 | Anderkay | .............. B62D 25/12 123/198 E |
| 5,379,990 | A | 1/1995 | Ando et al. | |
| 7,416,174 | B2 | * 8/2008 | Dickson | ................. F16F 15/08 267/141.1 |

(Continued)

FOREIGN PATENT DOCUMENTS

| | | |
|---|---|---|
| EP | 1 209 685 | 5/2002 |
| JP | S64-035386 | 3/1989 |

(Continued)

OTHER PUBLICATIONS

Office Action dated Nov. 2, 2015 in corresponding Chinese Application No. 201410344741.1 with English translation.

*Primary Examiner* — Melody Burch
(74) *Attorney, Agent, or Firm* — Harness, Dickey & Pierce, P.L.C.

(57) ABSTRACT

A vibration absorbing apparatus is provided which includes a vibration absorbing mechanism equipped with a spring mechanism and an elastic member. The elastic member is made of a non-metallic material and of a cylindrical shape. The elastic member is arranged coaxially with the spring mechanism and has a spring constant in a radial direction thereof which is lower than that in an axial direction thereof. The spring mechanism works to absorb vibration applied thereto in the axial direction thereof. The elastic member works to absorb vibration applied thereto in the radial direction thereof.

5 Claims, 7 Drawing Sheets

(56) References Cited

U.S. PATENT DOCUMENTS

| | | | | |
|---|---|---|---|---|
| 2002/0089101 A1* | 7/2002 | Itakura | G11B 33/08 | |
| | | | 267/136 | |
| 2004/0040809 A1* | 3/2004 | Gustavsson | F16F 1/3713 | |
| | | | 188/379 | |
| 2005/0028963 A1* | 2/2005 | Niwa | B60R 13/0876 | |
| | | | 165/5 | |
| 2006/0012091 A1* | 1/2006 | Rose | B64D 27/26 | |
| | | | 267/141 | |
| 2011/0057368 A1 | 3/2011 | Tajima et al. | | |
| 2013/0241125 A1* | 9/2013 | Helferich | F16F 7/00 | |
| | | | 267/141 | |

FOREIGN PATENT DOCUMENTS

| | | |
|---|---|---|
| JP | 06-119770 | 4/1994 |
| JP | 2002-048192 | 2/2002 |
| JP | 2010-014171 | 1/2010 |
| JP | 2009-275738 | 11/2011 |

* cited by examiner

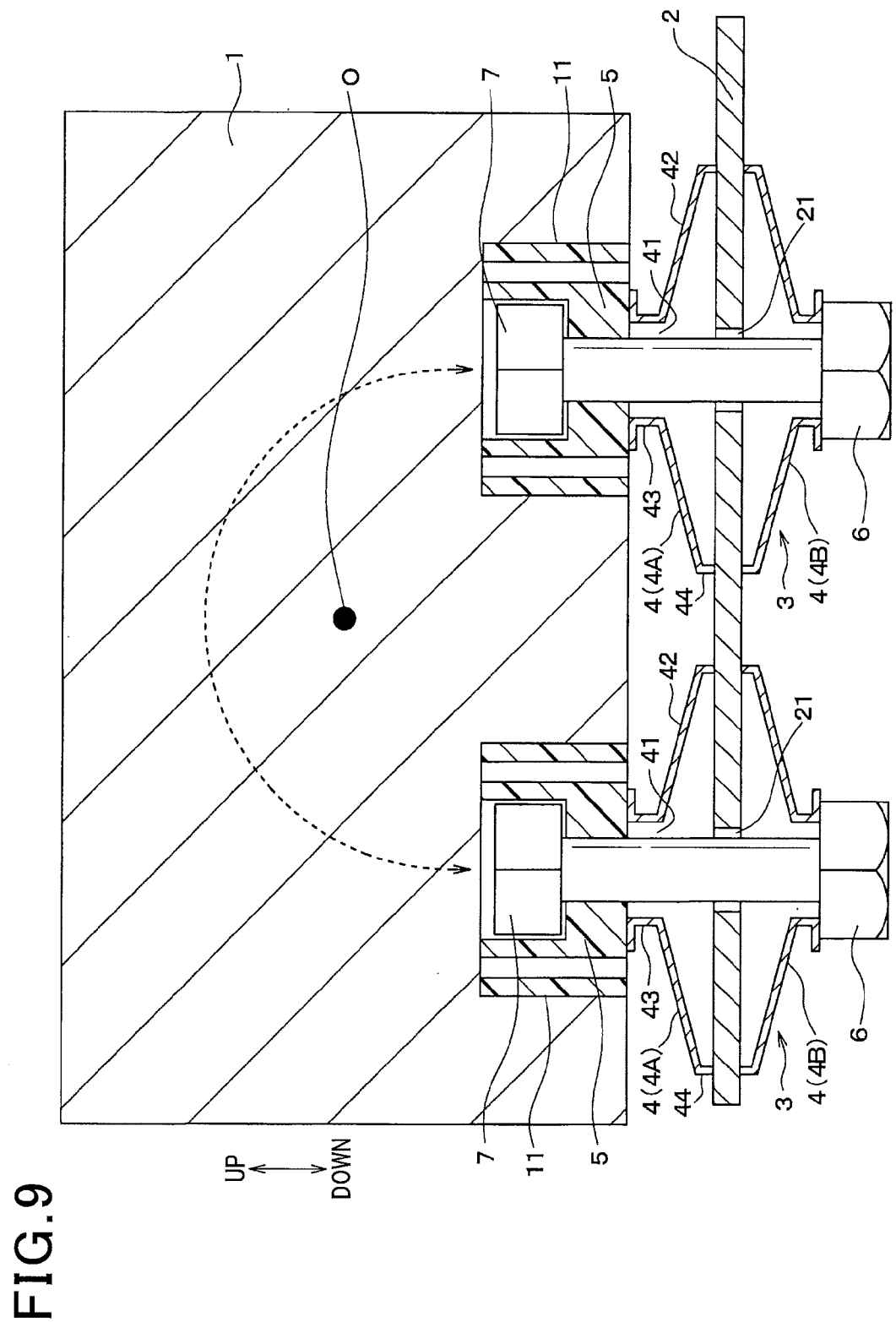

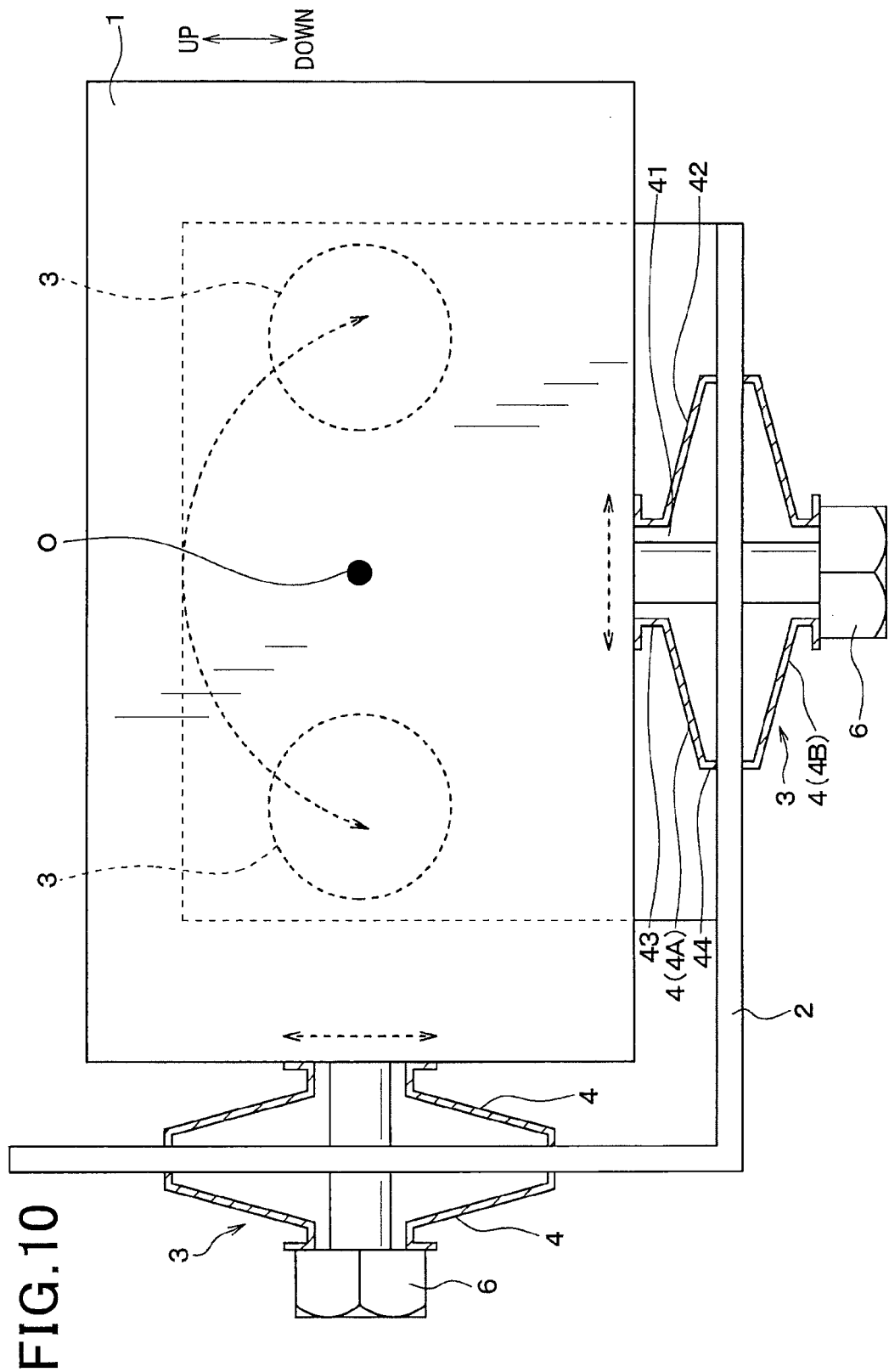

VIBRATION ABSORBING APPARATUS

CROSS REFERENCE TO RELATED DOCUMENT

The present application claims the benefit of priority of Japanese Patent Application No. 2013-149372 filed on Jul. 18, 2013.

BACKGROUND OF THE INVENTION

1. Technical Field

This disclosure relates generally to a vibration absorbing apparatus to minimize transmission of mechanical vibration between a first and a second member.

2. Background Art

Typical vibration absorbers are known which have a spring disposed between a first and a second members to suppress transmission of mechanical vibration therebetween.

Japanese Patent No. 4815469 teaches a spring made up of a spring body which is of a tapered disc-shape and hollow cylindrical protrusions. The spring body has a central hole and is deformable in an axial direction thereof. The cylindrical protrusions extend respectively from an inner circumference and outer circumference of the spring body in the axial direction of the spring body.

The above spring is engineered to bear a high load and have no hysteresis in load bearing characteristic thereof, thus permitting a spring constant for a high load to be decreased to absorb high-frequency vibration.

The spring is joined at one of the cylindrical protrusions to the first member and at the other protrusion to the second member to absorb mechanical vibration oriented in the axial direction of the spring, but it is difficult to absorb vibration acting in a radial direction (i.e., a horizontal direction) of the spring.

SUMMARY

It is therefore an object to provide an improved structure of a vibration absorbing apparatus which is equipped with a spring and engineered to absorb mechanical vibrations acting either in an axial direction of the spring or in another direction.

According to one aspect of this disclosure, there is provided a vibration absorbing apparatus which comprises: (a) a first member that is a vibration source; (b) a second member; and (c) a vibration absorbing mechanism which works to absorb vibration, as transmitted from the first member to the second member. The vibration absorbing mechanism includes a spring mechanism and an elastic member. The spring mechanism includes a tapered spring body and a cylindrical protrusion. The spring body has a central hole formed therein and is elastically deformable in an axial direction thereof. The cylindrical protrusion extends in the axial direction of the spring body from at least one of an inner periphery and an outer periphery of the spring body. The elastic member is made of a non-metallic material and of a cylindrical shape. The elastic member is arranged coaxially with the spring mechanism. The elastic member has a spring constant in a radial direction thereof which is lower than that in an axial direction thereof.

In operation, the spring mechanism works to absorb vibration applied thereto in the axial direction thereof. The elastic member works to absorb vibration applied thereto in the radial direction thereof. This minimizes transmission of the vibrations from the first member to the second member.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 9 is a vertical sectional view which illustrates a vibration absorbing apparatus according to a fourth embodiment; and FIG. 10 is a vertical sectional view which illustrates a vibration absorbing apparatus according to a fifth embodiment.

DESCRIPTION OF THE PREFERRED EMBODIMENTS

Figure 1:
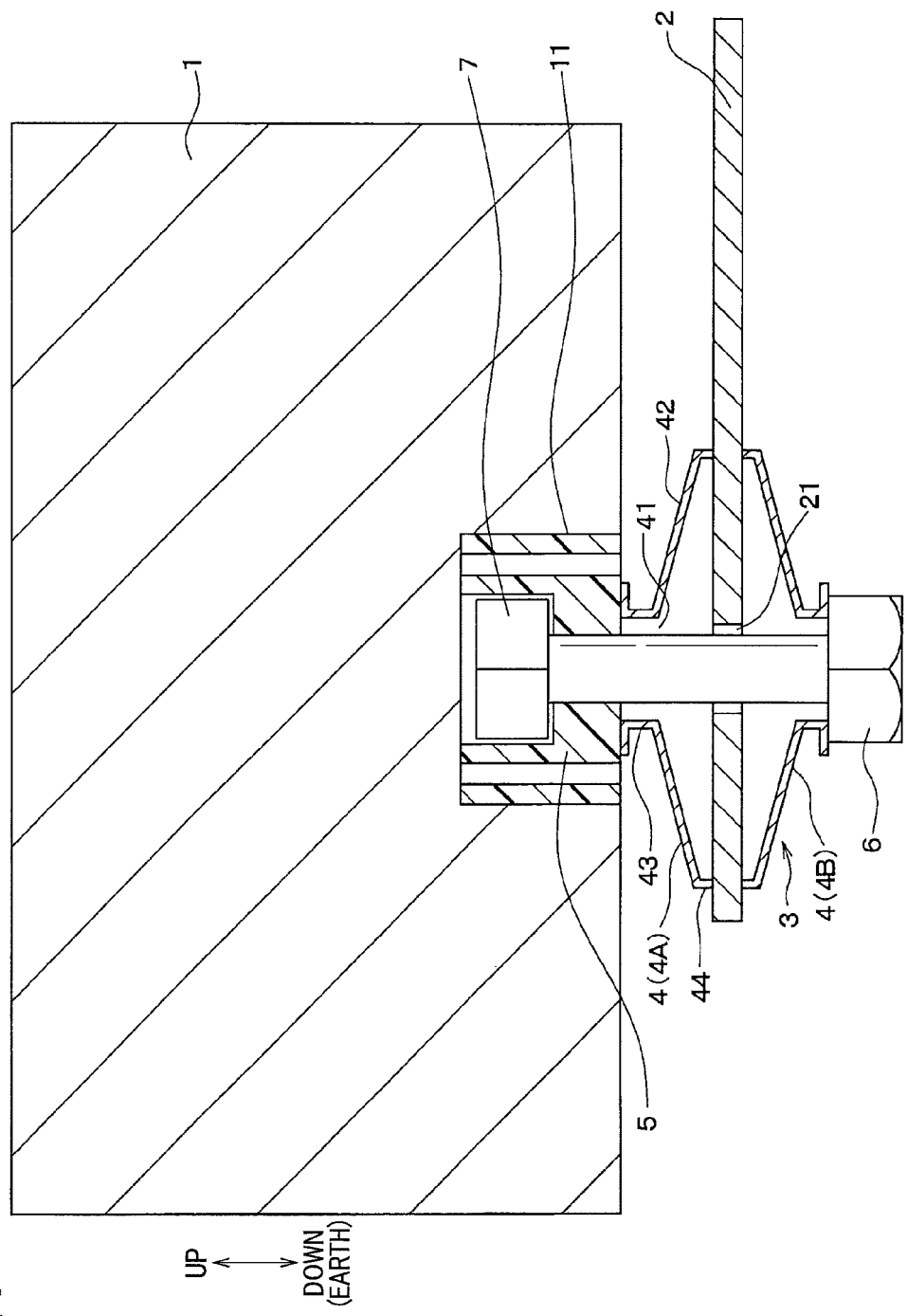
FIG. 1 is a vertical sectional view which illustrates a vibration absorbing apparatus according to a first embodiment.

Referring to the drawings, wherein like reference numbers refer to like parts in several views, particularly to FIG. 1, there is shown a vibration absorbing apparatus according to the first embodiment. The vibration absorbing apparatus is constructed of a first member 1, a second member 2, and a vibration absorber 3 which establishes a mechanical joint between the first member 1 and the second member 2 and works to suppress transmission of mechanical vibration therebetween. The first member 1 is a vibration source in this embodiment. Note that a vertical direction in FIG. 1 is a direction of the gravitational force. The vibration absorber 3 is located beneath the first member 1. The vibration absorber 3 will also be referred to as a vibration absorbing mechanism below.

The first member 1 has an absorber mount hole 11 formed in a lower surface thereof. The absorber mount hole 11 is defined by a cylindrical cavity made in the lower surface of the first member 1. The vibration absorber 3 includes an elastic block 5 fit in the absorber mount hole 11 of the first member 1. The first member 1, as referred to in the following discussion, is an actuator used to regulate the hydraulic pressure of brake fluid in an automotive vehicle. The actuator is equipped with a cuboid housing, a pump, an electric motor, etc. The electric motor works to drive the pump to pressurize the brake fluid.

The second member 2, as referred to in the following discussion, is a bracket secured to a body of the vehicle. The second member 2 has an absorber mount hole 21 passing through a thickness thereof. The vibration absorber 3 also includes a bolt 6 which is inserted into the absorber mount hole 21 of the second member 2. The second member 2 has an upper and a lower major surface and is disposed beneath the first member 1 with the upper major surface facing the lower surface of the first member 1.

The vibration absorber 3 is equipped with two springs 4, the elastic block 5, the bolt 6, and a nut 7. A combination of the bolt 6 and the nut 7 functions as a bar-shaped fastener to make a mechanical joint of the second member 2, the springs 4, and the elastic block 5. In the following discussion, one of the springs 4 will also be referred to as a first spring 4A, while the other will also be referred to as a second spring 4B. A combination of the first spring 4A and the second spring 4B or either one of them will also be referred to as a spring mechanism below.

Each of the springs 4 is made of metal and includes a spring body 42 which is of a tapered disc-shape and has a central hole 41 formed therein. The spring body 42 functions as a disc spring and is deformed in an axial direction (i.e., a vertical direction in FIG. 1) as a function of a degree of load applied thereto. The spring body 42 has a spring constant which is low when subjected to a high load.

Each of the springs 4 also includes an inner protrusion 43 and an outer protrusion 44. The inner protrusion 43 is of a hollow cylindrical shape and extends from an inner periphery of the spring body 42 (i.e., a circumference of the central hole 41) in the axial direction thereof. The outer protrusion 44 is of a hollow cylindrical shape and extends from an outer periphery of the spring body 42 in the axial direction thereof. Each of the springs 4 may be shaped to have at least one of the inner protrusion 43 and the outer protrusion 44.

Figure 4:
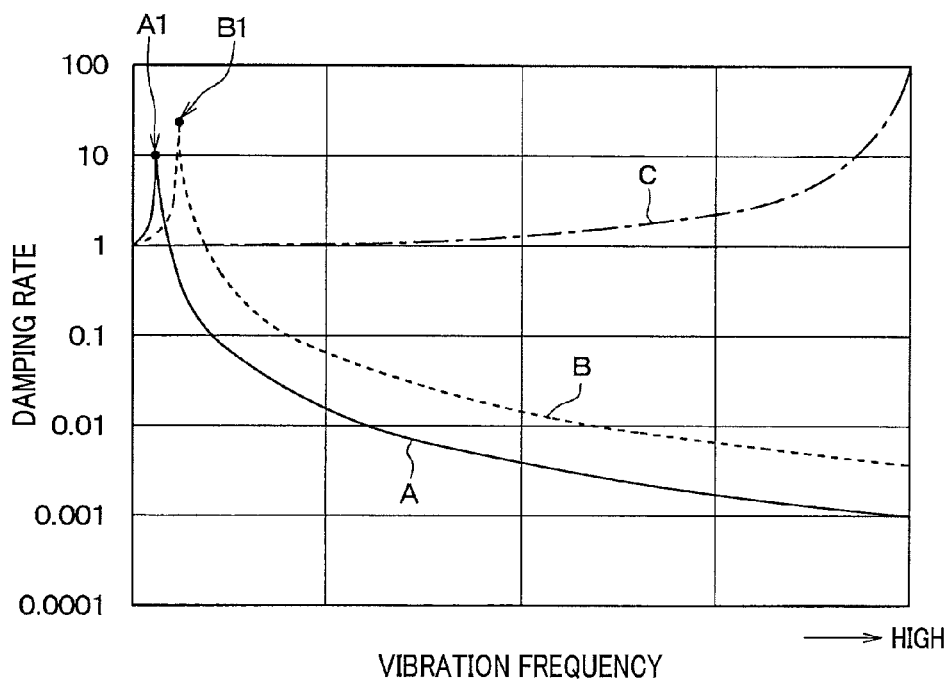
FIG. 4 is a graph which represents characteristics of a vibration absorber installed in the vibration absorbing apparatus of FIG. 1.

FIG. 4 represents characteristics of the vibration absorber 3. A solid line A indicates an attenuation rate (also called a damping rate) of the spring 4 for the frequency of vibration in the axial direction thereof. The spring 4 is capable of bearing a high load and absorbing a high-frequency vibration in the axial direction thereof.

Figure 2:
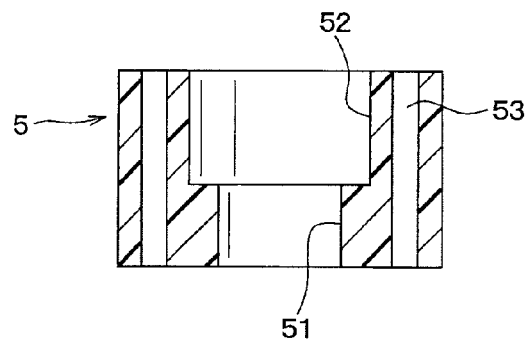
FIG. 2 is a longitudinal sectional view which illustrates an elastic block of a vibration absorber installed in the vibration absorbing apparatus of FIG. 1.
Figure 3:
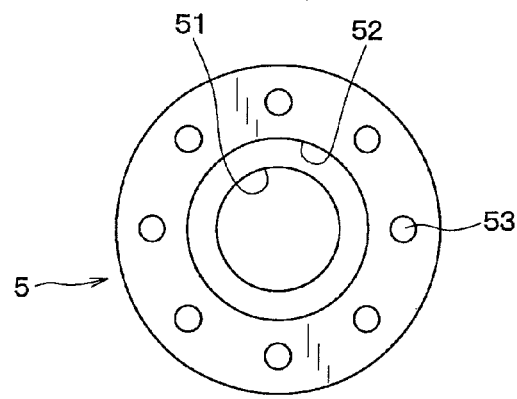
FIG. 3 is a top view of FIG. 2.

The elastic block 5 of the vibration absorber 3 is, as illustrated in FIGS. 1 to 3, made a non-metallic material which is of a hollow cylindrical shape. The elastic block 5 has a central hole 51 formed in a central portion thereof in a radial direction thereof (i.e., a horizontal direction, as viewed in FIGS. 1 to 3). The central hole 51, as clearly illustrate in FIG. 3, extends through a thickness of the elastic block 5. The central hole 51 is a hole through which the bolt 6 passes. The elastic block 5 also has a nut chamber 52 formed in the central portion thereof in the radial direction. The nut chamber 52 is exposed to the central hole 51 in alignment therewith. The nut 7 is stored in the nut chamber 52. The non-metallic material of the elastic block 5 may be rubber, silicon, or urethane.

The elastic block 5 also has formed therein a plurality of stiffness adjusting holes 53 arrayed at regular intervals around the central hole 51 and the nut chamber 52 in a circumferential direction of the elastic block 5. The stiffness adjusting holes 53 are located outside the central hole 51 and the nut chamber 52 in the radial direction of the elastic block 5. The stiffness adjusting holes 53 pass through the thickness of the elastic block 5 in the axial direction (i.e., the vertical direction in FIGS. 1 to 3). The stiffness adjusting holes 53 serve to facilitate the ease with which the elastic block 5 is deformed in the radial direction thereof, in other words, make a spring constant in the radial direction of the elastic block 5 lower than that in the axial direction thereof. Note that the spring constant in the radial direction of the elastic block 5 represents a spring constant the elastic block 5 exhibits when being subjected to force in the radial direction of the elastic block 5, and the spring constant in the axial direction of the elastic block 5 represents a spring constant the elastic block 5 exhibits when being subjected to force in the axial direction of the elastic block 5.

A broken line B in FIG. 4 indicates the attenuation rate of the elastic block 5 in the radial direction thereof. A dashed line C indicates the attenuation rate of the elastic block 5 in the axial direction thereof. The graph of FIG. 4 shows that the elastic block 5 is higher in spring constant in the axial direction thereof, so that it hardly absorb mechanical vibration in the axial direction, but lower in spring constant in the radial direction thereof, so that it is capable of well absorbing high-frequency vibration in the radial direction.

The springs 4 have a resonance point (i.e., a resonance frequency) A1 in the axial direction thereof. The elastic block 5 has a resonance point B1 in the radial direction thereof and a resonance point in the axial direction thereof. The resonance points A1 and B1 and the resonance point of the elastic block 5 in the axial direction are set different from each other.

Referring back to FIG. 1, each of the springs 4 and the elastic block 5 are disposed coaxially with each other and located adjacent each other. In other words, each of the springs 4 has the axis oriented in alignment of the axis of the elastic block 5. The first spring 4A is held between the second member 2 and the elastic block 5. The second member 2 is retained between the first spring 4A and the second spring 4B. The second spring 4B has an end retained by the head of the bolt 6.

The joint of the second member 2, the springs 4, and the elastic block 5 is achieved by inserting the bolt 6 through the absorber mount hole 21 of the second member 2, the central holes 41 of the springs 4, and the central hole 51 of the elastic block 5 and fastening the nut 7 onto the top of the bolt 6.

After the second member 2, the springs 4, and the elastic block 5 are joined together by the bolt 6 and the nut 7, the elastic block 5 is fitted (i.e., light press-fitted) into the absorber mount hole 11 of the first member 1, thereby securing the second member 2 and the vibration absorber 3 to the first member 1. When mounted in the first member 1, the vibration absorber 3 is oriented to have an axis extending in the vertical direction, that is, in alignment with the axial directions of the springs 4 and the elastic block 5 (i.e., the direction of the gravitational force).

When placed in the orientation illustrated in FIG. 1, the vibration absorber 3 is subjected to a load in the axial direction thereof which arises from the weight of the first member 1. The elastic block 5, as described above, has a spring constant great enough to bear the load applied in the axial direction thereof, so that it is hardly deformed elastically by the weight of the first member 1, while the springs 4 have a spring constant small enough to be elastically deformed when subjected to the weight of the first member 1. Specifically, the spring characteristics of the springs 4 are selected so that the spring constant in the axial direction thereof is lower than that of the elastic block 5 and induces the deformation of the springs 4 when undergoing the weight of the first member 1.

When the first member 1 vibrates, the vibration absorber 3 works to absorb a component of the vibration in the axial direction thereof (i.e., the direction of the gravitational force) through the springs 4 whose spring constant is low for the force applied in the axial direction and also absorb a component of the vibration in the radial direction (i.e., the horizontal direction) thereof through the elastic block 5 whose spring constant is lower for the force applied in the radial direction.

Specifically, the vibration absorber 3 works to suppress the transmission of vibrations from the first member 1 to the second member in all directions. For example, the vibration absorber 3 dampens mechanical vibration arising from actuation of the pump by the electric motor and blocks the transmission of the vibration to the body of the vehicle.

The vibration absorber 3 is, as described above, equipped with two types of vibration attenuators: the springs 4 which attenuates vibration in the axial direction thereof and the elastic block 5 which attenuates vibration in the radial direction thereof.

Figure 5:
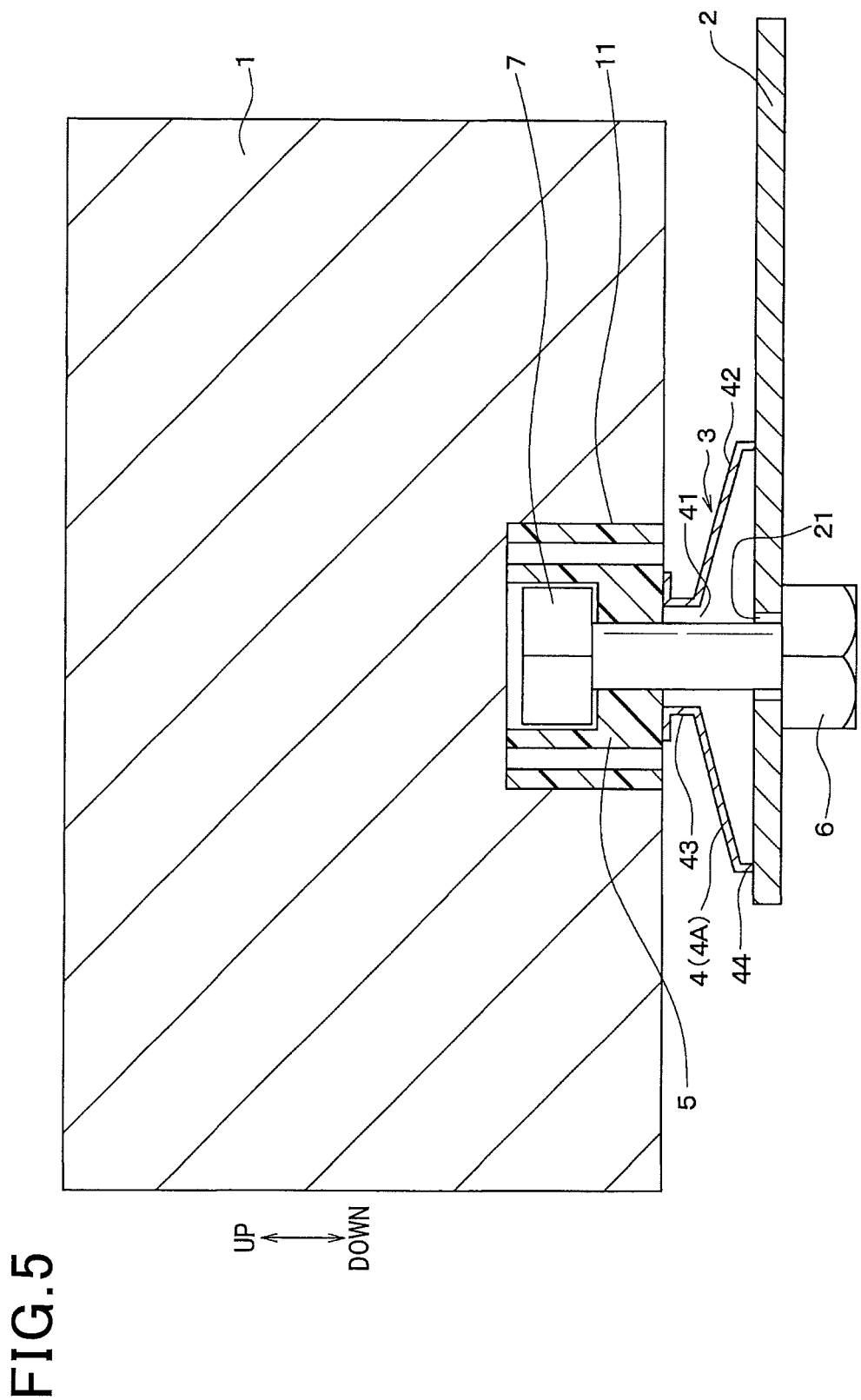
FIG. 5 is a vertical sectional view which illustrates a modification of the vibration absorbing apparatus of FIG. 1.

The resonance point (i.e., resonance frequency) A1 of the springs 4 in the axial direction thereof, the resonance point B1 of the elastic block 5 in the radial direction perpendicular to the axial direction of the springs 4, and the resonance point of the elastic block 5 in the axial direction are, as described above, selected to be different from each other, thus avoiding the occurrence of large resonant vibration The vibration absorber 5 may alternatively be, as illustrated in FIG. 5, designed to have a single spring 4. In this example, the second member 2 is retained between the spring 4 and the head of the bolt 6.

Figure 6:
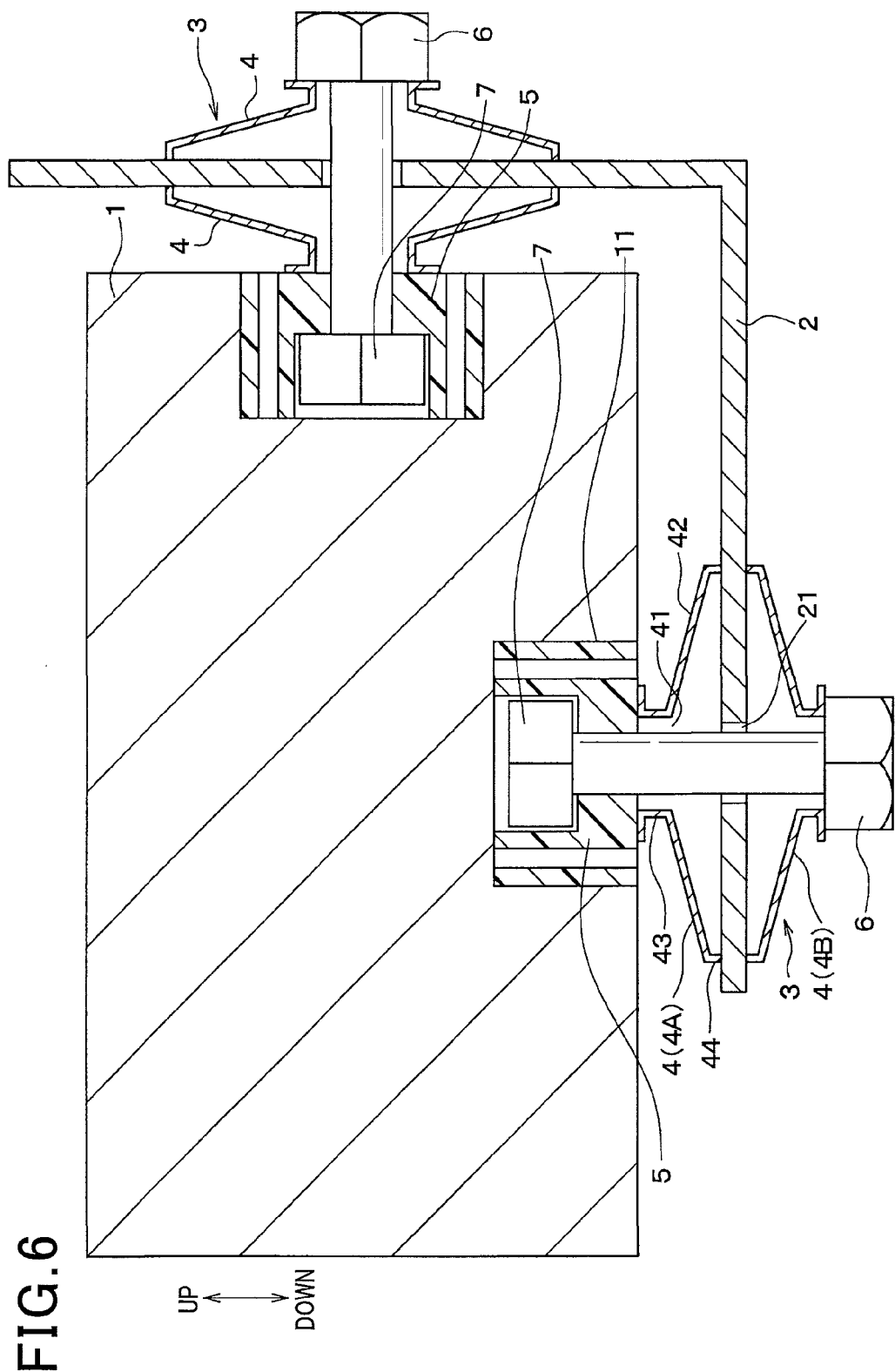
FIG. 6 is a vertical sectional view which illustrates a vibration absorbing apparatus according to a second embodiment.

FIG. 6 illustrates a vibration absorbing apparatus according to the second embodiment. The same reference numbers as employed in the first embodiment will refer to the same parts, and explanation thereof in detail will be omitted here.

The vibration absorbing apparatus of this embodiment is constructed of a vibration absorbing mechanism made of a combination of two vibration absorbers 3 each of which is identical in structure with the one in the first embodiment. One of the vibration absorbers 3 will also be referred to as a first vibration absorber, while the other will also be referred to as a second vibration absorber below.

The first vibration absorber 3 is attached to one of a plurality of surfaces of the first member 1 (i.e., a side wall of the first member 1 in this embodiment). The second vibration absorber 3 is, like in the first embodiment, attached to another surface of the first member 1 (i.e., the bottom wall of the first member 1 in this embodiment) which extends perpendicular the side wall thereof. The second member 2 is of an L-shape in cross section, that is, has a horizontal wall and a vertical wall. The horizontal wall faces the bottom wall of the first member 1. The vertical wall faces the side wall of the first member 1.

The second vibration absorber 3 which is fastened to the bottom wall of the first member 1 is oriented to direct an axis thereof in the vertical direction (i.e., the direction of the gravitational force), while the first vibration absorber 3 which is secured to the side wall of the first member 1 is oriented to direct an axis thereof in the horizontal direction. The installation of the first and second vibration absorbers 3 in the first member 1 is the same as in the first embodiment.

The first vibration absorber 3 secured to the side wall of the first member 1 is engineered to apply an adjustable load or pressure to the springs 4 and the elastic block 5. Such adjustment is achieved by tightening the bolt 6 to shorten the distance between itself and the nut 7. This applies a preselected load to the first vibration absorber 3 before being used. The elastic block 5 is higher in spring constant in the axial direction thereof and thus hardly deformed when being preloaded, while the springs 4 are deformed elastically when being preloaded, in other words, the spring characteristics of the springs 4 are set so as to have a spring constant which is low enough to be deformed when subjected to the preselected load.

The second vibration absorber 3 secured to the bottom of the first member 1 may also be preloaded in the same manner as in the first vibration absorber 3.

In operation, when the first member 1 vibrates, the springs 4 of the second vibration absorber 3 and the elastic block 5 of the first vibration absorber 3 work to absorb a component of the vibration acting in the axial direction thereof (i.e., the direction of the gravitational force). Additionally, the elastic block 5 of the second vibration absorber 3 and the springs 4 of the first vibration absorber 3 work to absorb a component of the vibration acting in the radial direction (i.e., the horizontal direction) thereof.

The vibration absorbing apparatus of this embodiment offers the same beneficial effects as those in the first embodiment and is useful in enhancing the suppression of vibrations to the second member 2 (i.e., the body of the vehicle) in all directions.

Figure 7:
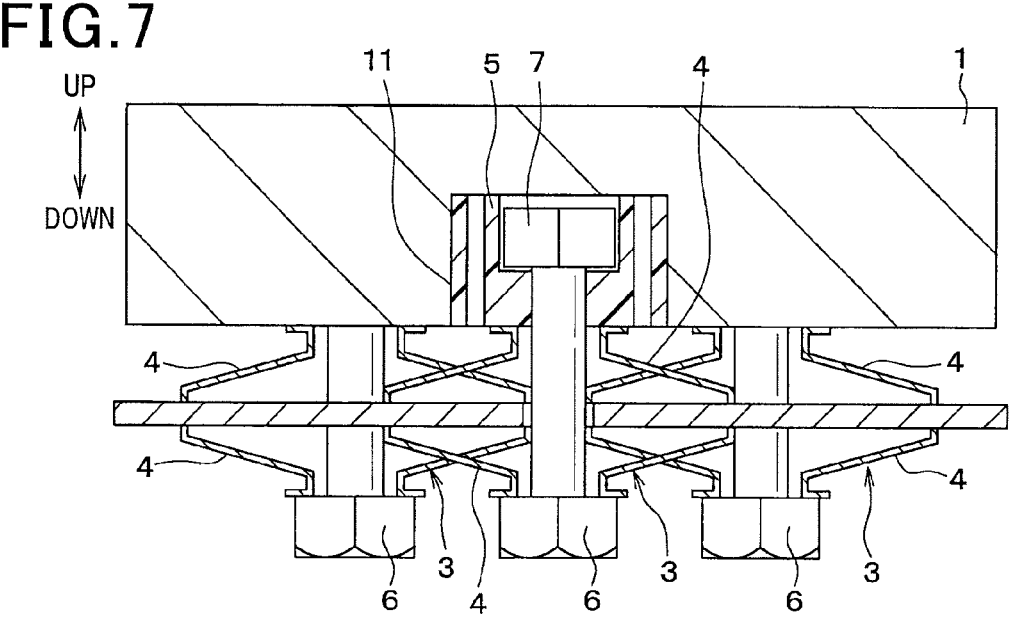
FIG. 7 is a vertical sectional view which illustrates a vibration absorbing apparatus according to a third embodiment.
Figure 8:
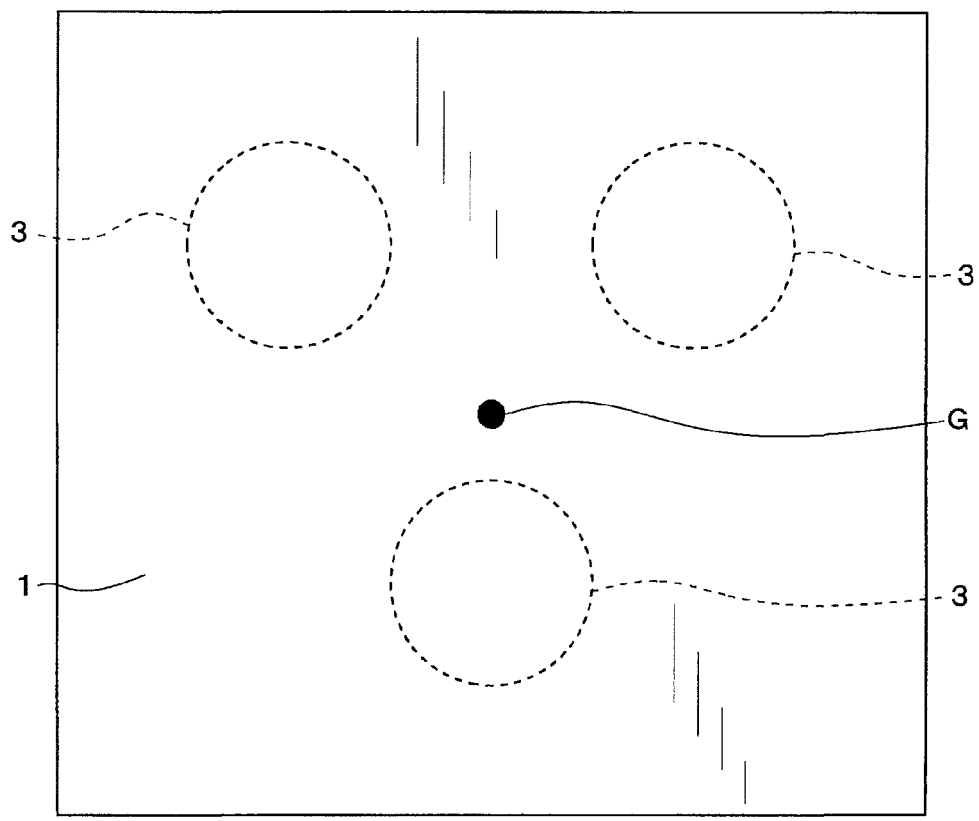
FIG. 8 is a plane view of FIG. 7.

FIGS. 7 and 8 illustrate a vibration absorbing apparatus according to the third embodiment. The same reference numbers as employed in the first embodiment will refer to the same parts, and explanation thereof in detail will be omitted here.

The vibration absorbing apparatus of this embodiment is constructed of a vibration absorbing mechanism made of a combination of three vibration absorbers 3 each of which is identical in structure with the one in the first embodiment.

The vibration absorbers 3 are, as clearly illustrated in FIG. 7, secured to the bottom wall (i.e., a lower surface) of the first member 1 with axes thereof being all oriented in the vertical direction like in the first embodiment. The vibration absorbers 3 are, as can be seen in FIG. 8, arrayed around the center of gravity G of the first member 1, as viewed perpendicular to the lower surface of the first member 1. More specifically, the layout of the vibration absorbers 3 relative to the center of gravity G of the first member 1 is determined so that a vibrational force is exerted by the first member 1 uniformly on all the vibration absorbers 3. The installation of the vibration absorbers 3 in the first member 1 is the same as in the first embodiment.

The above layout of the vibration absorbers 3 results in uniformity in vibration attenuation characteristics thereof, thus evenly absorbing vibrations transmitted to the second member 2 in all directions.

The vibration absorbing apparatus of this embodiment offers the same beneficial effects as those in the first embodiment and is useful in achieving uniform absorption of vibrations acing on the second member 2.

The vibration absorbing apparatus may be equipped with four or more vibration absorbers 3 attached to one of surfaces of the first member 1.

FIG. 9 illustrates a vibration absorbing apparatus according to the fourth embodiment. The same reference numbers as employed in the first embodiment will refer to the same parts, and explanation thereof in detail will be omitted here.

The first member 1 generates rotational vibration around an output shaft O (i.e., a rotating shaft) of an electric motor. The output shaft O extends horizontally in FIG. 9.

The vibration absorbing apparatus is equipped with a vibration absorbing mechanism made up of two vibration absorbers 3 which are secured to one of surfaces (i.e., the bottom wall in this embodiment) of the first member 1 with axes thereof being oriented in the vertical direction. Specifically, each of the vibration absorbers 3 is oriented to have the axis extending perpendicular to the length of the output shaft O of the electric motor. In other words, each of the vibration absorbers 3 is placed with the springs 4 being directed in a direction in which the springs 4 will be elastically deformed well when subjected to force developed by rotational vibration generated by actuation of the electric motor. The vibration absorbers 3 are disposed one on each side of the output shaft O, as viewed in the longitudinal direction of the output shaft O. In other words, the output shaft O is interposed between the axes of the vibration absorbers 3 which are arranged at a given interval away from each other in the horizontal direction (i.e., perpendicular to the output shaft O. The installation of the vibration absorbers 3 in the first member 1 is the same as in the first embodiment.

When the rotational vibration occurs around the output shaft O, a component of moment of the rotational vibration in the clockwise direction in FIG. 9 is dampened by compression of the first spring 4A and extension of the second spring 4B of a right one of the vibration absorbers 3, as viewed in FIG. 9, and extension of the first spring 4A and compression of the second spring 4B of a left one of the vibration absorbers 3, as viewed in FIG. 9.

A component of the moment of the rotational vibration in the counterclockwise direction in FIG. 9 is dampened by elongation of the first spring 4A and compression of the second spring 4B of the right vibration absorber 3 and compression of the first spring 4A and elongation of the second spring 4B of the left vibration absorber 3.

The vibration absorbing apparatus of this embodiment offers the same beneficial effects as those in the first embodiment and is, as described above, designed to attenuate the rotational vibration around the output shaft O of the electric motor in the first member 1.

FIG. 10 illustrates a vibration absorbing apparatus according to the fifth embodiment. The same reference numbers as employed in the first embodiment will refer to the same parts, and explanation thereof in detail will be omitted here.

The first member 1, like in the fourth embodiment, generates rotational vibration around an output shaft O (i.e., a rotating shaft) of an electric motor. The output shaft O extends horizontally in FIG. 10.

The vibration absorbing apparatus of this embodiment is equipped with a vibration absorbing mechanism made up of a total of four vibration absorbers 3 each of which is identical in structure with the one in the first embodiment. One of the vibration absorbers 3 is secured to the lower surface of the first member 1 and will also be referred to as a first vibration absorber 3 below. One of the vibration absorbers 3 is secured to a first side surface (i.e., a left side surface in the drawing) of the first member 1 and will also be referred to as a second vibration absorber 3 below. The remaining two of the vibration absorbers 3 are attached to a second side surface (i.e., the back surface in the drawing) of the first member 1 next to the first side surface and will also be referred to as a third and a fourth vibration absorber 3 below. The installation of the vibration absorbers 3 in the first member 1 is the same as in the first embodiment.

The second member 2 has three walls: one facing the lower surface of the first member 1, one facing the first side surface of the first member 1, and one facing the second side surface of the first member 1. The lower surface and the first side surface of the first member 1 extend perpendicular to each other. The second side surface of the first member 1 extends perpendicular to the lower surface and the first side surface of the first member 1.

The first vibration absorber 3 which is fastened to the bottom wall (i.e., the lower surface) of the first member 1 is oriented to direct an axis thereof in the vertical direction (i.e., the direction of the gravitational force) and perpendicular to the output shaft O of the electric motor.

The second vibration absorber 3 which is secured to the first side wall of the first member 1 is oriented to direct an axis thereof in the horizontal direction and perpendicular to the output shaft O of the electric motor.

The third and fourth vibration absorbers 3 which are secured to the second side wall of the first member 1 are oriented to direct axes thereof in the horizontal direction and parallel to the output shaft O of the electric motor. The third and fourth vibration absorbers 3 are also arranged one on each side of the output shaft O, as viewed in the longitudinal direction of the output shaft O. In other words, the output shaft O is interposed, as viewed in the lengthwise direction of the output shaft O, between the axes of the third and fourth vibration absorbers 3 which are disposed at a given interval away from each other in the horizontal direction (i.e., perpendicular to the output shaft O.

When the rotational vibration occurs around the output shaft O, the moment thereof is dampened by elastic deformation of the elastic blocks 5 of all the vibration absorbers 3 in the radial direction thereof.

The vibration absorbing apparatus of this embodiment offers the same beneficial effects as those in the first embodiment and is, as described above, designed to attenuate the rotational vibration around the output shaft O of the electric motor in the first member 1.

MODIFICATIONS

The vibration absorbers 3 used in the above embodiments are structured to join the second member 2, the springs 4, and the elastic block 5 together using the bolt 6 and the nut 7 and also fit the elastic block 5 within the absorber mount hole 11 of the first member 1 to secure itself to the first member 1, but however, the attachment of the vibration absorbers 3 to the first member 1 may alternatively be achieved by forming an internal thread formed on the bottom of the absorber mount hole 11 of the first member 1 and fastening the top end of the bolt 6 to the internal thread to connect the second member 2, the springs 4, and the elastic block 5 together.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The components constituting each of the embodiments are not necessarily essential features of the invention except those specified or considered in principle as ones of the essential features of the invention.

The number, size, or dimensions of the components of each of the embodiments are not necessarily limited to the illustrated or described one(s) except those that are clearly essentially for making the invention.

The configuration of or positional relation among the components of each of the embodiments are not necessarily limited to the illustrated or described one(s) expect those that are clearly essentially for making the invention.

What is claimed is:
1. A vibration absorbing apparatus comprising:
a first member that is a vibration source;
a second member; and
a vibration absorbing mechanism which works to absorb vibration, as transmitted from the first member to the second member, the vibration absorbing mechanism including a spring mechanism and an elastic member, the spring mechanism including a tapered spring body and a cylindrical protrusion, the spring body having a central hole formed therein and being elastically deformable in an axial direction thereof, the cylindrical protrusion extending in the axial direction of the spring body from at least one of an inner periphery and an outer periphery of the spring body, the elastic member being made of a non-metallic material and of a cylindrical shape, the elastic member being arranged coaxially with the spring mechanism, the elastic member having a spring constant in a radial direction thereof which is lower than that in an axial direction thereof; wherein the vibration absorbing mechanism also includes a bar-shaped fastener which joints the second member, the spring mechanism, and the elastic member together, the spring mechanism consisting of a first spring and a second spring, at least the first spring having the tapered spring body and the cylindrical protrusion, the second member having formed therein a hole through which the fastener passes, the elastic member having formed therein a hole into which the fastener is inserted, wherein the first spring is retained between the second member and the elastic member, the second member being held between the first spring and the second spring, and wherein the fastener passes through the hole of the second member and the central hole of the spring body and is disposed in the hole of the elastic member to make a joint of the second member, the first spring, and the second spring, and wherein the elastic member is secured to the first member.

2. A vibration absorbing apparatus as set forth in claim 1 wherein a resonance frequency of the spring mechanism in an axial direction thereof is different from that of the elastic member in the radial direction thereof.

3. A vibration absorbing apparatus as set forth in claim 1, wherein the vibration absorbing apparatus includes at least three vibration absorbing mechanisms which are attached to one surface of the first member, the vibration absorbing mechanisms being arranged around a center of gravity of the first member, as viewed in a direction perpendicular to the surface of the first member.

4. A vibration absorbing apparatus as set forth in claim 1, wherein the first member has a plurality of surfaces of the first member, and wherein the vibration absorbing apparatus includes a plurality of vibration absorbing mechanisms which are secured to the surfaces of the first member.

5. A vibration absorbing apparatus as set forth in claim 1, wherein the first member is equipped with a rotating shaft and generates rotational vibration around the rotating shaft, and wherein the vibration absorbing apparatus includes a plurality of vibration absorbing mechanisms which are secured to one surface of the first member, the vibration absorbers absorbing mechanisms being oriented perpendicular to the rotating shaft and arranged on both sides of the rotating shaft, as viewed in a longitudinal direction of the rotating shaft.

* * * * *